United States Patent [19]

Gonzalez

[11] B 3,999,309
[45] Dec. 28, 1976

[54] ANTHROPOMORPHOLOGICAL DUMMY FOR STUDYING THE BEHAVIOR OF THE HUMAN BODY

[75] Inventor: Boris Gonzalez, Issy les Moulineaux, France

[73] Assignee: Societe Anonyme Automobiles Citroen, Paris, France

[22] Filed: Jan. 31, 1975

[21] Appl. No.: 546,097

[44] Published under the second Trial Voluntary Protest Program on March 23, 1976 as document No. B 546,097.

[30] Foreign Application Priority Data

Feb. 8, 1974  France .............................. 74.04355

[52] U.S. Cl. .................................................. 35/17
[51] Int. Cl.² ......................................... G09B 23/00
[58] Field of Search ........................................ 35/17

[56] References Cited

UNITED STATES PATENTS

| 2,288,296 | 6/1942 | Munro | 35/17 |
| 3,562,925 | 2/1971 | Baermann | 35/17 |
| 3,792,854 | 2/1974 | Sierra | 35/17 X |
| 3,890,723 | 6/1975 | Haurat | 35/17 |

Primary Examiner—Harland S. Skogquist
Attorney, Agent, or Firm—Lewis H. Eslinger

[57] ABSTRACT

An anthropomorphological dummy for studying the behavior of the human body, for example as the occupant of an automobile involved in an accident, comprises a thoracic cage housing an air inflatable pocket containing bodies simulating the lungs and the heart. A liquid-filled pocket located within an abdominal cavity contains bodies simulating the liver, the spleen, and the pancreas. An air-inflatable ring simulating the intestines is located within the liquid-filled pocket and is attached thereto at one point.

9 Claims, 7 Drawing Figures

U.S. Patent   Dec. 28, 1976   Sheet 2 of 2   3,999,309
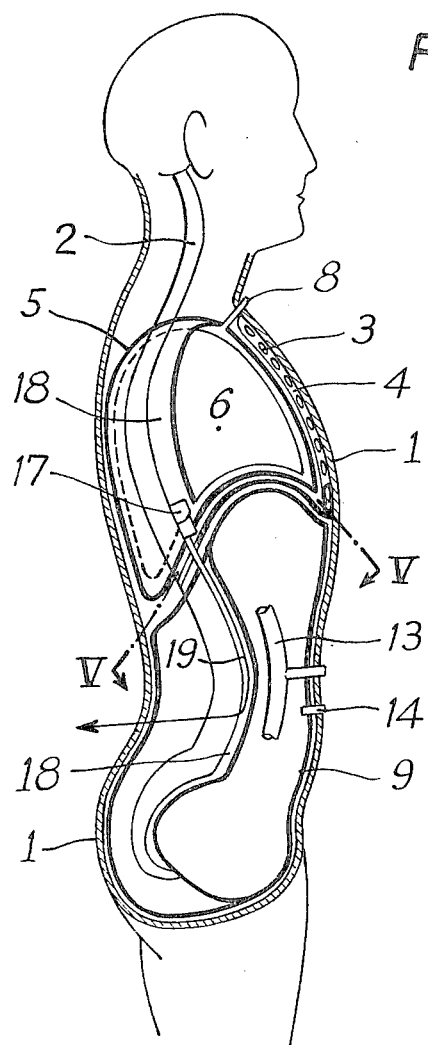
FIG. 2
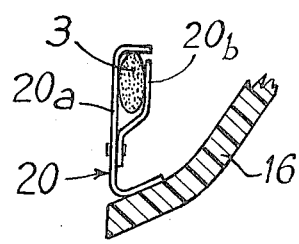
FIG. 6
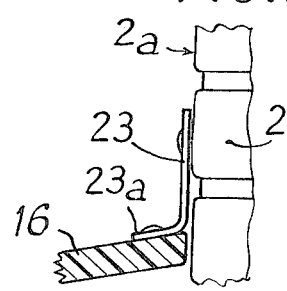
FIG. 7
FIG. 5

ANTHROPOMORPHOLOGICAL DUMMY FOR STUDYING THE BEHAVIOR OF THE HUMAN BODY

BACKGROUND OF THE INVENTION

1. Field of the Invention.

The present invention relates to anthropomorphological dummies and more particularly to a hydro-pneumatic system situated in the trunk of an anthropomorphological dummy to simulate the balance and the thoracic-abdominal pressure compensation in a human being.

2. Description of the Prior Art.

For the purpose of studies and tests relating to the behaviour of the human body when subjected to certain external loads, particularly as the occupant of an automobile vehicle, use has been made of anthropomorphological dummies in which instruments have been placed for measuring various phenomena to which they are subjected. The principle disadvantage of previously proposed dummies resides in their lack of true representation of the human body, because of their construction, in particular with regard to the physiological compensation at the level of the trunk of the human body.

SUMMARY OF THE INVENTION

According to the present invention, there is provided a hydro-pneumatic system for a anthropomorphological dummy comprising a thoracic-abdominal cavity confined by an envelope enclosing a rachis, and, in its upper part, a rib assembly connected to the rachis and defining with a sternum, a thoracic cage, said system comprising a first fluid-tight inflatable pocket disposed in the interior of the said thoracic cage, an alveolate air permeable material simulating the lungs and enclosed within the first pocket, a body fixed to the internal wall of said pocket, and simulating the heart, a second fluid-tight resilient pocket in the interior of the abdominal cavity of the dummy, said second pocket being arranged to be filled with a liquid, bodies enclosed within the second pocket and simulating respectively the liver, the spleen, and the pancreas, said bodies being fixed to the internal wall of the pocket, a hollow inflatable ring enclosed within the second pocket, said ring simulating the intestines, said ring being fixed at a single point to the said second pocket, and fluid connections leading from the first and second pockets and the ring to the exterior of the dummy whereby fluid can be fed through the connections to the first and second pockets and the ring, each said connection comprising valve means.

Further according to the present invention, there is provided in an anthropomorphological dummy, means defining a thoracic cage, a first, inflatable, pocket located within the cage, said pocket being composed of a resilient material, bodies enclosed within the first pocket to simulate internal organs of the body, means defining an abdominal cavity, a second pocket located within said cavity, said second pocket being composed of a resilient material, bodies enclosed within the second pocket to simulate further internal organs of the body, an inflatable tube located within the second pocket to simulate the intestine, first valve means operative to connect the first pocket to a source of gas, second valve means operative to connect to second pocket to a source of liquid, and third valve means operative to connect the tube to a source of gas.

Preferably, there is provided between the two pockets a resilient membrane of predetermined elasticity, simulating the diaphragm, and connected in a demountable manner by means of hooks at its external contour, to the lower part of the aforesaid rib assembly and to the lateral parts of the rachis. Alternatively, the membrane can be formed by an upper reinforced part of the second pocket.

The pockets and the membrane preferably define, with the lower part of the rachis, a free space.

Advantageously, the pockets and the membrane are of an elastic material having a predetermined elasticity and resistance and the elements forming the heart, the liver, the spleen, and the pancreas are of semi-hard material and the element forming the intestines is of flexible rubber.

Preferably, the valve means for the first pocket extends to the outside of the dummy above the sternum, the valve means for the second pocket extends to the outside of the dummy at the level of the navel and the valve means for the ring likewise extends to the outside of the dummy at the level of the navel.

BRIEF DESCRIPTION OF THE DRAWINGS

An embodiment of the invention will now be described by way of example only, with reference to the accompanying diagrammatic drawings, in which:

FIG. 2 is a view in section of the side of the dummy;

FIG. 5 is a section, to an enlarged scale, taken on line V—V of FIG. 2; and

FIGS. 6 and 7 are sections, to enlarged scales, taken on lines VI—VI, and VII—VII respectively, of FIG. 5.

DESCRIPTION OF THE PREFERRED EMBODIMENT

Figure 1:
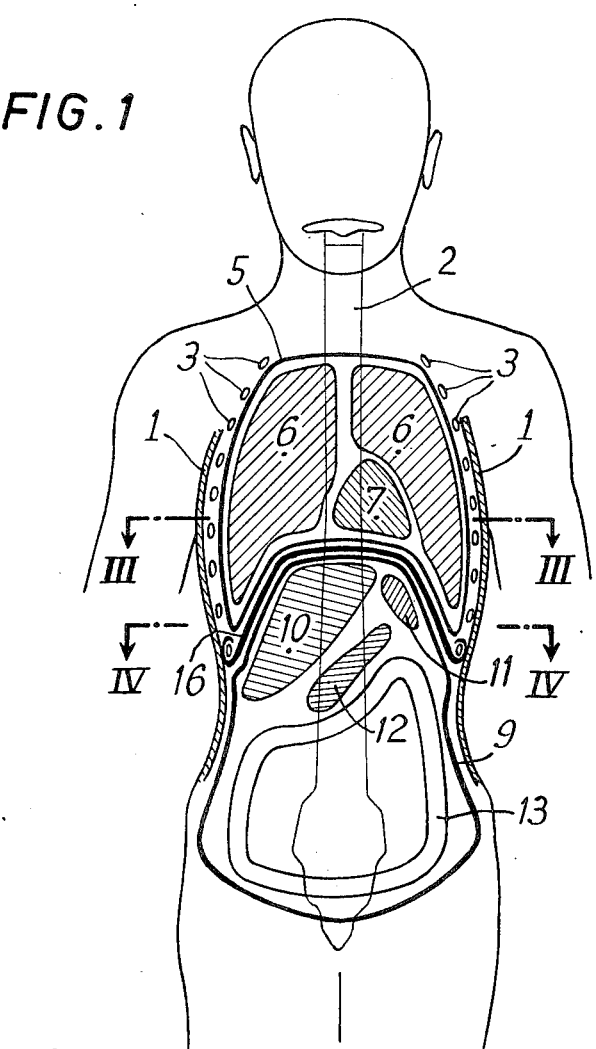
FIG. 1 is a view in section from the front of a dummy provided with a system in accordance with the invention.

As shown in FIGS. 1 and 2, an anthropomorphological dummy comprises a trunk 1 defining the thoracic-abdominal cavity, in which is placed a rachis 2. A thoracic cage comprising a rib assembly 3 is connected at the rear to the rachis 2 and at the front to a sternum 4. The rib assembly 3 contains a fluid-tight pocket or chamber 5 of an elastic material (for example rubber) having a predetermined resistance, the pocket 5 enclosing an alveolate material 6 simulating the lungs, and a compact body 7 of semi-hard material (for example semi-hard rubber) simulating the heart.

The pocket 5 has an air inlet valve 8 leading to the outside of the dummy above the sternum 4. The valve 8 is provided with a female screw thread and enables connection of the pocket 5 to a compressed air source in order to effect, and to maintain, inflation of the pocket 5 at a predetermined pressure. The alveolate material 6 is permeable to air to enable the filling of each of its alveoles to the aforesaid pressure. The body 7 is fixed at several points to the internal wall of the pocket 5.

The portion of the abdominal cavity situated below the thoracic cage contains a second fluid-tight pocket or chamber 9 of an elastic material (for example rubber) having a predetermined resistance, the pocket 9 enclosing bodies 10, 11 and 12 of semi-hard material (for example semi-hard rubber) secured partially to its internal wall and simulating, respectively the liver, the spleen, and the pancreas. The pocket 9 also contains a hollow ring 13 of flexible rubber simulating the intestines.

A valve 14 extending externally of the dummy at the level of the navel is connected to the pocket 9 and is arranged for connection to a source of liquid. In this manner a predetermined, controllable, quantity of liquid having a controllable and predetermined viscosity can be injected into the pocket 9. A valve 15 also extending externally of the dummy at the level of the navel is connected to the hollow ring 13, the valve 15 being arranged for connection to a source of compressed gas, for example air, in order to permit, and to maintain, inflation of the ring 13 at a predetermined pressure. The passage of the valve 15 through the pocket 9 constitutes the sole point of securing of the ring 13 to the pocket 9. The ring 13 thus constitutes a loop which can, in effect, float in the liquid contents of the pocket 9. A domed membrane 16, concave downwards, simulates the diaphragm and is disposed between the pocket 5 and the pocket 9. The membrane 16 is of flexible rubber of predetermined elasticity connected as described below, to the lower edges of the rib assembly 3 and to the lateral faces 2a of the rachis 2. This membrane is capable of being interchanged as a function of the desired elasticity of the diaphragm.

Figure 3:
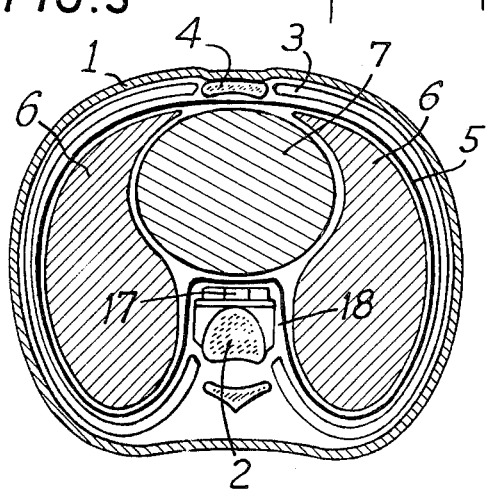
FIG. 3 is a section, to an enlarged scale, taken on line III—III of FIG. 1.
Figure 4:
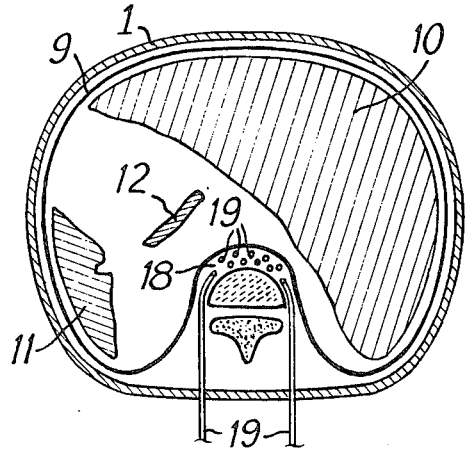
FIG. 4 is a section, to an enlarged scale, taken on line IV—IV of FIG. 1.

As can be seen from FIG. 3, the dummy is equipped in a known manner at the level of the lower face of the rachis with a measuring device such as an accelerometer 17. The shape of the pocket 5 is such that it defines, with the rachis, a free space 18 in which other suitable measuring devices are located. At the level of the abdominal zone as shown in FIG. 4, it will be noted that the pocket 9 also defines a free space 18 with the lower face of the rachis 2 in such a manner to provide a passage for conductors 19 which lead from the measuring devices to associated apparatus (not shown) externally of the dummy. The conductors 19 extend externally from the dummy at the level of the lumbar region as schematically shown in FIG. 2.

FIG. 5 shows the disposition and the connection of the membrane 16 in relation to the other elements of the dummy. It will be seen that a series of hooks 20 is disposed at the periphery of the membrane 16 and the hooks engage the second row of ribs of the assembly 3. This fixing arrangement is illustrated in FIG. 6 in which a hook 20 is constituted by two parts 20a and 20b defining between them a space capable of containing one rib 3. The part 20a of the hook is rigid with the membrane 16 whilst the part 20b is fixed in position on the part 20a for example by means of a rivet or a pin indicated at 21. The attachment of the membrane 16 on the hook 20 is demountable.

The membrane 16 is secured to the sides 2a of the rachis 2, as shown in FIG. 7, by a securing strap 23 fixed by suitable means to the rachis and having a curved part 23a which is connected in known manner to the membrane 16. This arrangement, at the level of the rachis 2 enables the preservation, at the height of the diaphragm, of the space 18 for the passage of the conductors 19.

The dummy described above is suitably representative of the human body. In fact, the pocket 5 and the ring 13 being inflatable to the desired pressures, and the pocket 9 being filled with a predetermined quantity and viscosity of liquid, the assembly being joined to the elasticity of the pockets and to the skin of the dummy, provides a certain hydro-pneumatic balance of the thoracic-abdominal system in the trunk of the dummy. By varying the pressures of the gas contained in the lung-forming parts 6 the intestine-forming part 13 and on the quantity and viscosity of the fluid admitted into the pocket 9, it is possible to modify at will this state of balance and thus to simulate a large number of different states in which the human body may exist in real life. In practice the air pressure admitted into the lung-forming parts 6 will be slightly in excess of the pressure normally encountered in the human body in order to take into account the action of the intercostal and thoracic muscles.

The freedom of movement which the ring 13 has in the interior of the pocket 9 simulates fairly accurately the variable positions which can be taken up by the intestines of a human body when they are subjected to different variations in pressure. Further, possibility of replacing the diaphragm by a diaphragm of a different initial elasticity enables the dummy to be modified in order to take into account various human constitutions liable to be encountered.

The disposition and form of the elements as particularly described advantageously enable the measuring devices to be grouped along the vertebral column with a single exit being provided at the level of the lumbar region of the dummy for the associated conductors.

In a modified form (not shown) there may be no independent diaphragm, the pockets 5 and 9 being directly in contact with one another at the lower level of the thoracic cage of the dummy, the lower pocket being reinforced at this level.

The dummy particularly described is particularly suitable for use in studies and tests relating to the behaviour of the human body submitted to various conditions, particularly in an automobile subject to deceleration and shocks.

The system particularly described can be used with anthropomorphological dummies at present in existance to enable an improvement of their behavioural characteristics by simulating in a precise manner the hydro-pneumatic thoracic-abdominal compensation as a function of the conditions to which it is subjected.

What is claimed is:

1. A hydro-pneumatic system for a anthropomorphological dummy comprising a thoracic-abdominal cavity confined by an envelope enclosing a rachis, and, in its upper part, a rib assembly connected to the rachis and defining with a sternum, a thoracic cage, said system comprising
   a first fluid-tight inflatable pocket disposed in the interior of the said thoracic cage,
   an alveolate air permeable material simulating the lungs and enclosed within the first pocket,
   a body fixed to the internal wall of said pocket, and simulating the heart,
   a second fluid-tight resilient pocket in the interior of the abdominal cavity of the dummy, said second pocket being arranged to be filled with a liquid,
   bodies enclosed within the second pocket and simulating respectively the liver, the spleen, and the pancreas, said bodies being fixed to the internal wall of the pocket,
   a hollow inflatable ring enclosed within the second pocket, said ring simulating the intestines, and being fixed at a single point to the said second pocket, and fluid connections leading from the first and second pockets and the ring to the exterior of the dummy whereby fluid can be fed through the connections to the first and second pockets and the ring, each said connection comprising valve means.

2. A system according to claim 1, further comprising a flexible membrane disposed between the first and second pockets, said membrane simulating the diaphragm.

3. A system according to claim 1, wherein the upper part of the second pocket is reinforced to define a membrane simulating the diaphragm.

4. A system according to claim 2, further comprising means releasably securing the membrane simulating the diaphragm to the lower ribs of the rib assembly and to the lateral parts of the rachis.

5. A system according to claim 3, further comprising means releasably securing the membrane simulating the diaphragm to the lower ribs of the rib assembly and to the lateral parts of the rachis.

6. A system according to claim 2, wherein the pockets and the membrane define with the lower part of the rachis a free space, said system further comprising measuring means, and
conductor means leading from the measuring means, said measuring means and conductor means being located in said free space.

7. A system according to claim 1, wherein the pockets are composed of a material of predetermined resistance and elasticity, the bodies simulating the heart, the liver, the spleen, and the pancreas are composed of a semi-hard material, and the ring defining the intestines is composed of a flexible resilient material.

8. A system according to claim 1, wherein the valve means associated with the first pocket lies outside the dummy above the sternum, the valve means associated with the second pocket lies outside the dummy at the level of the navel, and the valve means associated with the ring lies outside the dummy at the level of the navel.

9. In an anthropomorphological dummy, means defining a thoracic cage,
a first, inflatable, pocket located within the cage, said pocket being composed of a resilient material,
bodies enclosed within the first pocket to simulate internal organs of the body,
means defining an abdominal cavity,
a second pocket located within said cavity, said second pocket being composed of a resilient material,
bodies enclosed within the second pocket to simulate further internal organs of the body,
an inflatable tube located within the second pocket to simulate the intestine,
frist valve means operative to connect the first pocket to a source of gas,
second valve means operative to connect to second pocket to a source of liquid, and
third valve means operative to connect the tube to a source of gas.

* * * * *